US012139262B2

(12) United States Patent
Majumder et al.

(10) Patent No.: US 12,139,262 B2
(45) Date of Patent: Nov. 12, 2024

(54) ELECTRICAL POWER TRANSMISSION FOR PROPELLER DEICING

(71) Applicant: UBIQ Aerospace AS, Trondheim (NO)

(72) Inventors: Shibarchi Majumder, Trondheim (NO); Kim Sørensen, Trondheim (NO)

(73) Assignee: UBIQ Aerospace AS, Trondheim (NO)

( * ) Notice: Subject to any disclaimer, the term of this patent is extended or adjusted under 35 U.S.C. 154(b) by 0 days.

(21) Appl. No.: 18/274,809

(22) PCT Filed: Feb. 14, 2022

(86) PCT No.: PCT/EP2022/053530
§ 371 (c)(1),
(2) Date: Jul. 28, 2023

(87) PCT Pub. No.: WO2022/175208
PCT Pub. Date: Aug. 25, 2022

(65) Prior Publication Data
US 2024/0109663 A1   Apr. 4, 2024

(30) Foreign Application Priority Data
Feb. 16, 2021 (GB) .................................. 2102174

(51) Int. Cl.
*B64D 15/12* (2006.01)
*B64C 11/00* (2006.01)

(52) U.S. Cl.
CPC .............. *B64D 15/12* (2013.01); *B64C 11/00* (2013.01)

(58) Field of Classification Search
CPC ................................ B64D 15/12; B64C 11/00
See application file for complete search history.

(56) References Cited

U.S. PATENT DOCUMENTS 1,807,359 A   5/1931   Waters
4,699,568 A   10/1987  Harlamert et al.
(Continued)

FOREIGN PATENT DOCUMENTS

EP   2218643 A1   8/2010
EP   2860111 A1   4/2015
(Continued)

OTHER PUBLICATIONS

International Search Report and Written Opinion, International Application No. PCT/EP2022/053530, mailed May 10, 2022.
(Continued)

*Primary Examiner* — Rodney A Bonnette
(74) *Attorney, Agent, or Firm* — MARSHALL, GERSTEIN & BORUN LLP

(57) ABSTRACT

A propulsion system for a propeller of an aircraft is described, wherein the propulsion system allows for transmission of electrical power such as for a deicing system for the propeller. The propulsion system comprises a rotatable shaft for transmission of mechanical power; aircraft end electrical connections at an aircraft end of the shaft for connection to first and second terminals of a source of electrical power; propeller end electrical connections at a propeller end of the shaft and being for connection to first and second terminals for supplying electrical power to electrical components on the propeller; and a mechanical coupling at the propeller end of the shaft for mounting the propeller to the shaft. The shaft comprises: an inner conductor extending along the length of the shaft; an outer conductor extending along the length of the shaft; and an electrical insulator extending along the shaft in between the inner and outer conductor.

25 Claims, 5 Drawing Sheets

(56) References Cited

U.S. PATENT DOCUMENTS

| | | | |
|---|---|---|---|
| 2015/0104308 A1* | 4/2015 | Perkinson | B64D 15/12 |
| | | | 416/1 |
| 2015/0260047 A1* | 9/2015 | Gieras | H05B 1/0236 |
| | | | 416/95 |
| 2017/0233063 A1* | 8/2017 | Zhao | B64U 50/13 |
| | | | 403/322.2 |
| 2024/0262511 A1* | 8/2024 | Majumder | H05B 3/56 |

FOREIGN PATENT DOCUMENTS

| | | |
|---|---|---|
| EP | 2919555 A1 | 9/2015 |
| WO | WO-2018/037022 A1 | 3/2018 |

OTHER PUBLICATIONS

Search Report, British Application No. 2102174.6, dated Nov. 12, 2021.

* cited by examiner

ELECTRICAL POWER TRANSMISSION FOR PROPELLER DEICING

FIELD OF THE DISCLOSURE

The present invention relates to a propulsion system for a propeller, such as a propeller of an aircraft. This may be implemented in a system also including a propeller and may be provided as an integral part of an aircraft such as an unmanned aircraft. Related methods are also described.

BACKGROUND

It is known to use propellers for powering vehicles such as aircraft. In an electrical propulsion system for an aircraft, the propeller is mounted on a shaft that is driven by an electric motor. In certain weather conditions there is a risk of formation of ice on surfaces of an aircraft. Various systems have been proposed for detecting and removing the risk associated with ice. WO 2018/037022 describes earlier innovations owned by the present applicant in relation to ice protection for static flight surfaces. It would be beneficial to allow for similar systems for deicing and for detection of icing conditions to be used for moving flight surfaces such as propellers. As is apparent from WO 2018/037022 and other known systems it can be important for the surfaces in question to have access to electrical power, such as for sensors and/or heating sources. There are consequently particular challenges when providing ice protection systems for propellers.

One example of a deicing system for a propeller can be found in U.S. Pat. No. 4,699,568, which describes a propeller with deicing heating elements on each blade. These heating elements receive electrical power from a power source on board the aircraft, with the electrical power being transmitted to the propeller via slip rings embedded within a bulkhead of the spinner of the propeller.

SUMMARY

Viewed from a first aspect, the invention provides a propulsion system for a propeller of an aircraft, the propulsion system comprising: a rotatable shaft for transmission of mechanical power; aircraft end electrical connections at an aircraft end of the shaft for connection to first and second terminals of a source of electrical power; propeller end electrical connections at a propeller end of the shaft, spaced apart from the aircraft end of the shaft, and being for connection to first and second terminals for supplying electrical power to electrical components on the propeller; and a mechanical coupling at the propeller end of the shaft for mounting the propeller to the shaft; wherein the shaft comprises: an inner conductor extending along the length of the shaft and providing an electrically conductive path between the first terminal of the aircraft end electrical connection and the first terminal of the propeller end electrical connection; an outer conductor extending along the length of the shaft and providing an electrically conductive path between the second terminal of the aircraft end electrical connection and the second terminal of the propeller end electrical connection; and an electrical insulator extending along the shaft in between the inner and outer conductor.

The proposed propulsion system has a considerably different construction to prior art systems, allowing for effective transmission of electrical power along an elongate shaft in a way that is not possible with known slip ring arrangements. The propulsion system is able to transmit both of electrical power and mechanical power, for example for rotating a propeller as well as energizing a deicing system of the propeller. The use of concentrically arranged conductors and insulator conveniently uses the same elements for transfer of mechanical loads as well as for flow of electricity, providing a simple and effective design. Further refinements may add further advantages, as discussed below.

The rotatable shaft is typically an elongate member with a shape having rotational symmetry, and may hence be a cylindrical shaft. Rotational symmetry is important to minimise stresses and vibration for a rotating shaft. The cross-section may also have rotational symmetry, and thus the cross-section of the conductors and insulator may have rotational symmetry. In some embodiments the conductors and insulator have a concentric arrangement and may for example take the form of nested tubes or cylinders. The outer conductor may be radially outward of the inner conductor. The outer conductor may be a tube, optionally a circular tube, which may form the outer surface of the shaft; the insulator may be tubular and may be fitted within the tube of the outer conductor along all of or most of its length; and the inner conductor may have a tubular outer cross-section, optionally a circular cross-section, and may be fitted within the tube of the insulator along all of or most of its length. The inner conductor may be a solid circular cylinder or may be a circular tube. The latter can allow for further elements to extend along the shaft through the centre thereof.

The outer conductor may be surrounded by a protective and or insulating layer along at least a part of its length, which may for example prevent transmission of electricity to surrounding or supporting structures such as bearings or mechanical connections for receiving mechanical power from an aircraft propeller driver system.

The aircraft end electrical connections may comprise electrical couplings joining moving surfaces of the shaft to static conductive parts that are for connection to fixed parts of the aircraft. Thus, there may for example be a slip ring arrangement using slip rings formed as circles about the axis of the shaft and suitable static parts, such as brushes or other suitable slip ring connectors. One example arrangement uses a surface of the outer conductor as a slip ring surface for the connection to the first terminal of the aircraft end electrical connections, such as the outer surface of the conductor. A slip ring surface for the connection to the second terminal of the aircraft end electrical connections may be provided by a surface of the inner conductor, e.g. an outer surface thereof, and the inner conductor therefore may extend axially beyond the extent of the outer conductor and the insulator, protruding further at the aircraft end, in order to permit ease of access for the aircraft end electrical connections and the slip ring surface thereof. A suitable conductive and wear resistant layer may be present at the slip ring surfaces.

The propeller end electrical connections are advantageously fixed connections, with no relative movement. These connections create electrical pathways from the outer and inner conductors, via the first and second terminals for supplying electrical power to electrical components on the propeller. The propeller end electrical connections may comprise contact between surfaces of the outer and inner conductors and optionally one or more surfaces of the mechanical coupling for mounting the propeller to the shaft. In one example a first collar is provided in electrical contact with the outer conductor and being for electrical contact with the first terminal at the propeller end, which may for example be at a first contact surface on the propeller. A second collar may be provided in electrical contact with the inner conductor and for electrical contact with the second terminal, which may be at a second contact surface on the propeller.

The first collar may surround the outside of the outer conductor and may be configured to abut the propeller at the first contact surface thereof, which may also be a first mechanical loadbearing surface of the propeller. The first collar may thus provide an electrical connection for the first terminal as well as a mechanical contact for fixing the position of the propeller on the shaft. In some examples the first collar is a first propeller locking nut.

The second collar may be configured for placement on an opposite surface of the propeller to the first collar, i.e. further along the shaft toward the propeller end. Optionally the second collar may fit across the end of the shaft. The second collar may thus be a cap piece. The second collar may optionally have the added function of securing the propeller to the shaft, e.g. via mechanical coupling of the second collar to a part of the shaft, or alternatively there may be a separate second propeller locking nut for contact with a second mechanical loadbearing surface of the propeller. In order to perform its function within the electrical connection the second collar should be electrically connected to the inner conductor. The second collar may be shaped to extend from the inner conductor to the second contact surface of the propeller, for example the second collar may have a cupped shape allowing for it to be placed against the contact surface of the propeller at the rim of the cup, with the inner conductor and other parts, e.g. the second propeller locking nut, extending into the cup and the inner conductor connecting with the base of the cup.

In the case where a second propeller locking nut is used then this may fit to the outer conductor without any onward electrical connections to other parts. An insulating washer may be placed between the second propeller locking nut and the second collar in that situation.

The second collar may have a connection such as a threaded or friction fit connection to the inner conductor and to facilitate this the inner conductor may extend beyond the outer conductor and insulator at the propeller end of the shaft. Thus, in some example embodiments the inner conductor is longer than both of the outer conductor and the insulator, and the inner conductor protrudes beyond both of the outer conductor and the insulator at the aircraft end of the shaft and at the propeller end of the shaft.

The rotatable shaft and corresponding parts of the propulsion system should be differentiated from disc-like components such as those used for power transfer within certain spinner arrangements. The rotatable shaft may hence be seen as an elongate shaft, e.g. with length greater than its diameter, typically several times greater. The cross-section of the conductors and insulator may be constant along the length of the outer conductor. At the ends of the shaft there may be a change in cross-section, e.g. with the inner conductor protruding further for electrical connections as discussed above. In a typical implementation the length of the shaft is at least four times its diameter and may be in the range of four to ten times its diameter. In context of a relatively small and automated air vehicle (e.g. UAV or UAM vehicle), for which the present system is considered to provide particular advantages, the shaft may have a diameter in the range 3 to 60 and a length in the range 15 to 500 mm, optionally a diameter of 4 to 40 mm and/or a length of 20 to 400 mm, within which ranges the length may be four to ten times the diameter, optionally five to eight times the diameter.

The propulsion system may include the propeller, which may be mounted to the shaft and/or electrically coupled to the shaft as set out above. The propeller includes the electrical components for receiving electrical power conducted along the shaft. These electrical components may comprise components on the propeller for heating and/or sensing functions. The electrical components may be on blades of the propeller. The electrical components may comprise heating elements for a deicing system, and in particular they may include electro-thermal elements for controlling ice conditions on surfaces of the propeller, such as the blade surfaces. The heating elements may be provided within the blades of the propeller for heating the leading edges of the propeller. In some examples the heating elements are of the type described in WO 2018/037022. Thus, the heating element may comprise a layered composite structure, for example as described in WO 2018/037022

The electrical elements may comprise sensing elements for detection of thermal and/or aerodynamic conditions at the propeller. Such sensing elements may provide measurements for use in control of a deicing system, e.g. one using the heating elements discussed above. The sensing elements may be configured provide data to a deicing control system, which may for example be a deicing control system of the aircraft. The data from the sensing elements may be transmitted wirelessly and/or through connections provided via the rotatable shaft. A data connection via the shaft may be achieved by data signals combined with the electrical power transmitted on the inner and outer conductors. In the alternative, or additionally, a data connection via the shaft may use other means extending along the shaft such as optical communications as discussed below.

The propeller may comprise electrical pathways for supply of electrical power to the electrical components via the first and second terminals of the propeller end electrical connections. These pathways may comprise the contact surfaces discussed above as well as conductive materials embedded within the propeller, such as conductive pathways leading to electro-thermal elements for providing heating to the propeller surfaces. Alternatively or additionally there may be conductive pathways leading to sensing elements for detection of thermal and/or aerodynamic conditions at the propeller. The propeller may comprise an electrical circuit for providing power to one or both of heating elements and sensing elements and/or for transmission of data from sensing elements.

As noted above, a data connection via the shaft may use other means extending along the shaft such as optical communications. Some embodiments may advantageously include one or more optical path along the shaft. This may be included via a channel at the centre of the shaft, e.g. in a hollow within a tubular inner conductor. The hollow may be empty or may be filled with an optically transmissive material, such as a suitably translucent or transparent glass or plastic material. Alternatively or additionally there may be one or more optical channel within the electrical insulator, e.g. via an opening along the length of the insulator or by use of an optically transmissive material for some or all of the insulator, such as a suitably translucent or transparent and electrically insulating glass or plastic material.

The inner and outer conductors may be a metal material for providing both electrical conductivity and mechanical strength for transmission of mechanical power. Aluminium, high carbon steels or titanium alloys may be used since they provide the required conductivity and strength, as well as being suitably lightweight for aircraft use. In some implementations the outer conductor is designed to carry the majority of the mechanical loads and hence may be made of higher strength metals, such as high carbon steel or titanium alloy, whereas the inner conductor may be made of a material selected for lighter weight such as aluminium alloy or a copper based material. The insulator may be an insulating polymer such as polytetrafluoroethylene (PTFE). Where an optical communication channel is present then this may use materials of the type known for fibre optic communications.

The propulsion system may comprise the propeller as noted above. It may include connections for receiving mechanical power, such as from a motor of the aircraft, with such connections taking the form of couplings for transfer of mechanical power to the shaft in order to rotate the shaft and hence rotate the propeller. The propulsion system may comprise a motor for providing mechanical power, for example an electric motor. The propulsion system may include a source of electrical power connected to the aircraft end electrical connections via the first and second terminals thereof. This may for example be a battery system. Advantageously, the propulsion system may be fully electric and may use a single power source, such as a battery system, for powering the motor as well as for electrical power that is used for the electrical components on the propeller.

It will be appreciated that the propulsion system has particular benefits in the case of an electrically powered aircraft and/or a small and/or automated aircraft such as an unmanned aerial vehicle (UAV) or an urban air mobility (UAM) aircraft. Such UAVs or UAMs may use a fuel powered engine or may be fully electric. In a further aspect, the invention provides an aircraft comprising a propulsion system as discussed above in the first aspect, and optionally including any of the other features discussed above. The aircraft may hence include a propeller deicing system using the shaft to transmit electrical power to heating elements.

According to another aspect, the invention provides a method for providing electrical power to a propeller, the method comprising using a system as defined in the first aspect. The method may optionally use a system with other features as set out above. The method can be a part of a method for control of deicing of the propeller, where the system is used for transmitting electrical power and/or data for a deicing system, such as one comprising heating elements and/or sensor elements as set out above.

BRIEF DESCRIPTION OF THE DRAWINGS

Certain preferred embodiments of the present invention will now be described, by way of example only, with reference to the following drawings, in which.

DETAILED DESCRIPTION

Figure 1:
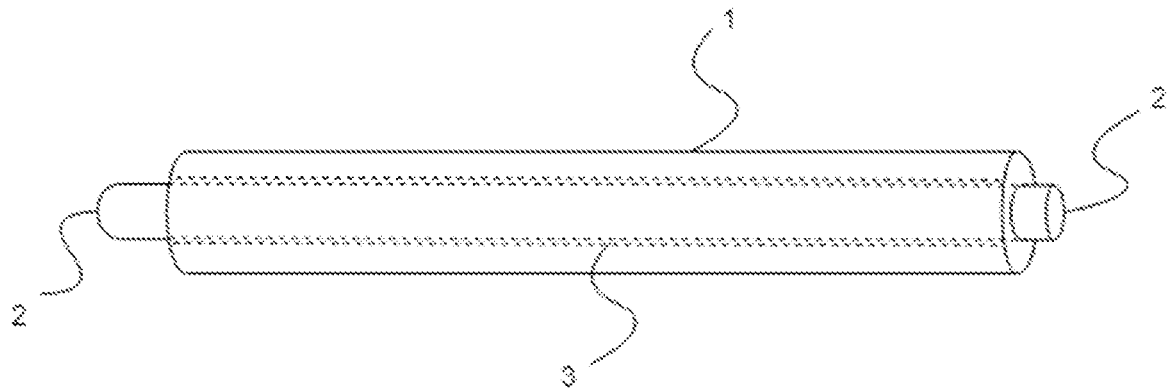
FIG. 1 is a schematic illustration of a rotatable shaft for transmission of electrical power and mechanical power.

An electrical propulsion system for an aircraft includes a rotor/propeller, a shaft, and a driving system, such as an electrical motor. As proposed herein, and as shown in the Figures a shaft 1, 2, 3, is provided for delivering electrical power to a propeller 17, and optionally for establishing a data communication link with the propeller 17. As best shown in FIG. 1 (or in modified form in FIG. 5 or 8), the shaft 1, 2, 3, comprises two metal cylinders 1, 2, and at least one hollow insulating cylinder 3 such that the insulating cylinder 3 tightly fits inside a hollow metal cylinder 1 and the other metal cylinder 2 tightly fits inside the insulating cylinder 3. To allow for ease of electrical connections the inner metal cylinder 2 can be longer in length than the outer metal cylinder 1 and the insulating cylinder 3 such that a direct contact can be made on the protruding parts of each end of the inner cylinder 1, as discussed in more detail below. The two metal cylinders 1, 2 isolated by the insulating cylinder 3 are used as two channels to transmit electric current.

Figure 2:
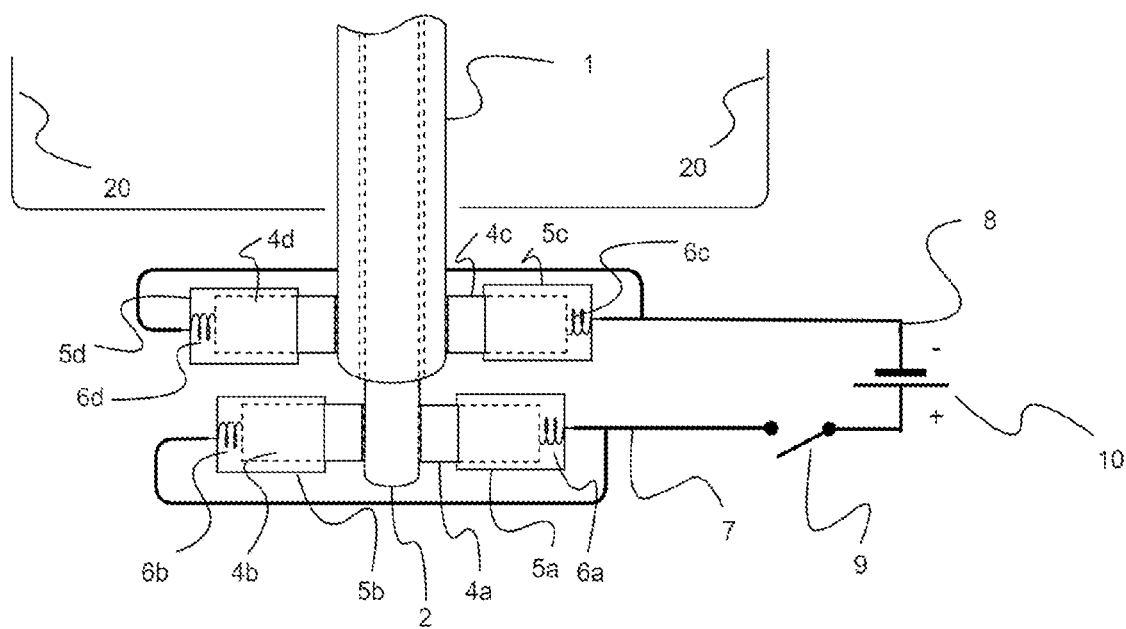
FIG. 2 is a schematic illustration of the electrical power input mechanism for the shaft of FIG. 1.

With reference to FIG. 2, the bottom end of the inner metal cylinder 1, which is at an aircraft end of the shaft, is energised with positive potential energy via a carbon brushes 4a, 4b and the bottom end of the outer cylinder is grounded with further carbon brushes 4c, 4d. The carbon brushes 4a, 4b, 4c, 4d are biased toward the shaft by respective springs 6a, 6b, 6c, 6d within suitable cylinders 5a, 5b, 5c, 5d. The surfaces of the inner and outer cylinders hence provide a slip ring arrangement. Other suitable slip ring designs could alternatively be used. This forms the basis for an aircraft end electrical connection. The aircraft end of the shaft 1, 2, 3 can also have mechanical connections (not shown) for coupling to a motor for powering the propeller.

The aircraft end electrical connection includes the two pairs of conductive brushes 4a, 4b, 4c, 4d, electrical connectors 7,8, a power source 10, and a switching mechanism 9. In this way, the aircraft end of the shaft is electrically connected to first and second terminals for an electrical circuit on the aircraft. The aircraft electrical circuit may of course be a part of a larger aircraft electrical system and may include other parts (not shown), such as a control system for controlling deicing of the propeller.

Figure 3:
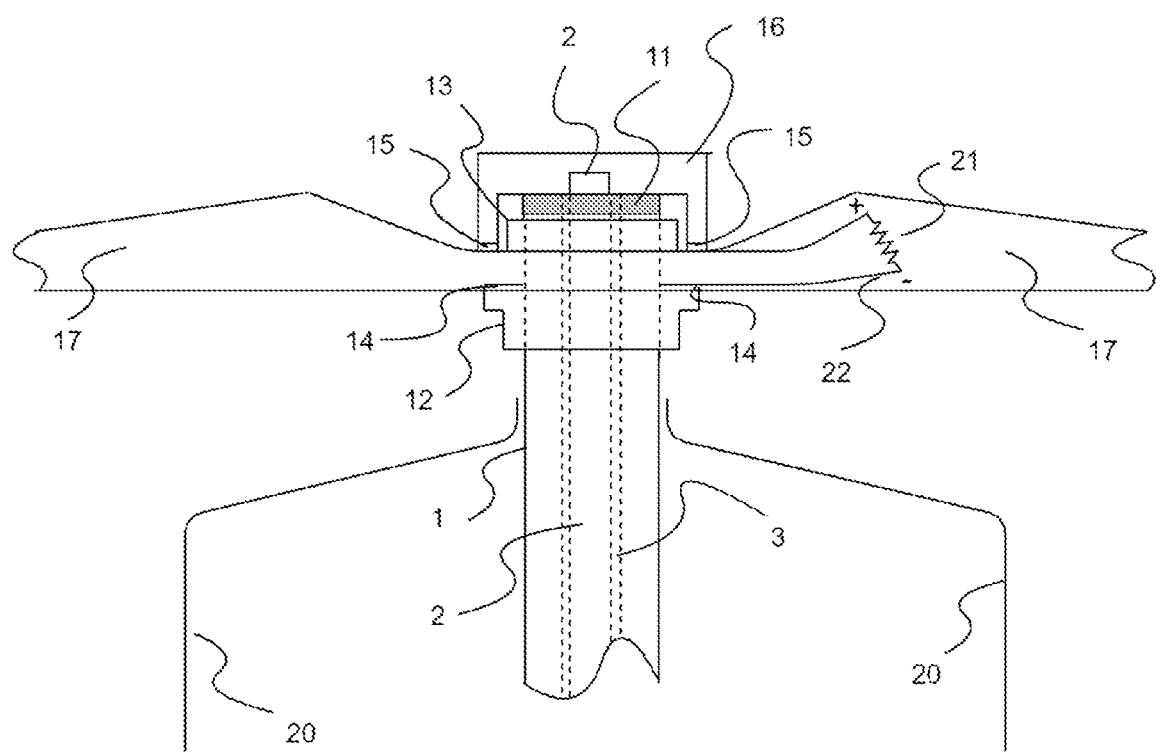
FIG. 3 shows the propeller mounting on the propeller end of the shaft.

At the propeller end of the shaft, as show in FIG. 3, there is provided a propeller 17, which is advantageously of custom design, a propeller locking mechanism 12, 13, a non-conductive washer 11, and a custom hub cap 16. The propeller locking mechanism 12, 13 includes a bottom propeller locking nut 12 and a top propeller locking nut 13. The bottom propeller locking nut 12 also provides a first collar 12 as a part of aircraft end electrical connections. There is electrical contact between the inner surface of the bottom propeller locking nut 12 and the outer surface of the outer metal cylinder 1, and electrical contact at an axial facing surface of the bottom propeller locking nut 12 with first contact surfaces 14 on the propeller. This connects the first terminal at the aircraft end electrical connection to a first terminal at the propeller end electrical connection via the conductive pathway provided by the outer metal cylinder 1. The top propeller locking nut 13 is in mechanical contact with shaft and the secures the propeller 17 on the shaft, pressing it against the bottom propeller locking nut 12. In this example the top propeller locking nut 13 does not have any electrical function. To ensure that there is no conductance of electricity from the outer cylinder 1 via the top propeller locking nut 13 an electrically insulating washer is placed on top of the top propeller locking nut 13.

To complete the electrical circuit via connection of the second terminals the aircraft end electrical connections use a second electrically conductive collar 16 provided in this example by the hub cap 16. The cap 16 has a cupped shape and the rim of the cup is placed in electrical contact with a second contact surface 15 on the propeller hub section, with the base of the cup in electrical contact with the inner cylinder 2.

Also seen in FIG. 3 is a schematic representation of the motor cowling 20, with the shaft 1, 2, 3 extending into the motor cowling 20 toward the aircraft end of the shaft. There may be a bearing (not shown) supporting the shaft at the motor cowling 20. The motor cowling may hold the motor and/or mechanical connections of the motor to the shaft 1, 2, 3. To avoid unwanted electrical connection between the outer cylinder 1 and the motor cowling 20 there may be an insulating barrier either as a part of the bearing or provided by a layer on the outer surface of the shaft 1, 2, 3.

The electrical circuit allows for power to be provided via the metal cylinders 1, 2 to a load, which can be a heating element as shown by heating coil 21 in FIG. 3. The heating coil 21 is electrically connected to the first and second contact surfaces 14, 15 by connectors 22 inside the propeller 17.

Figure 4:
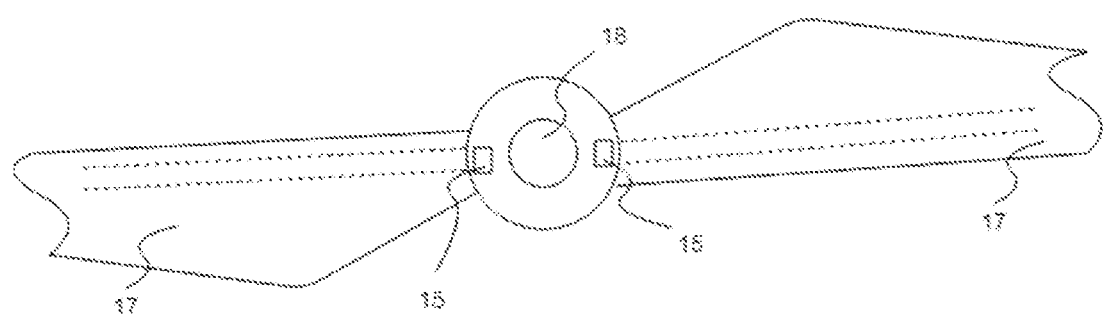
FIG. 4 is another view of the propeller on the shaft.

FIG. 4 shows another view of the propeller 17 including the propeller bore 18, which receives the shaft 1, 2, 3. As seen in FIG. 4 the contact surfaces 15 may be contact patches on the surface of the blades of the propeller 17. Since the cap 16 can contact the propeller 17 around the entire rim thereof then there is a reliable electrical contact with no need for specific alignment of the shaft or of the cap 16. A similar arrangement can be used for the first electrical contacts 14 and their electrical connection to the ring shaped axial facing surface of the bottom propeller locking nut 12.

FIGS. 5 to 10 show two versions of a variation in which the shaft 1, 2, 3 is modified via addition of an optical communication path. This may for example be used for data communications with electrical elements on the propeller, such as sensing elements used for control of a deicing system that also uses the heating coil 21.

Figure 5:
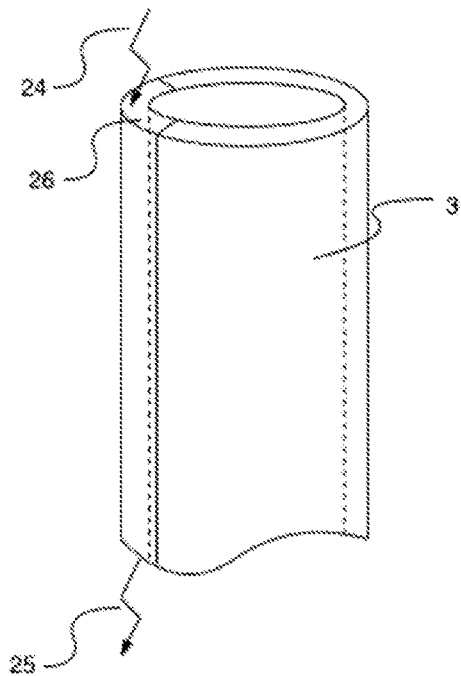
FIG. 5 shows a similar shaft adapted to include an optical communication channel.
Figure 6:
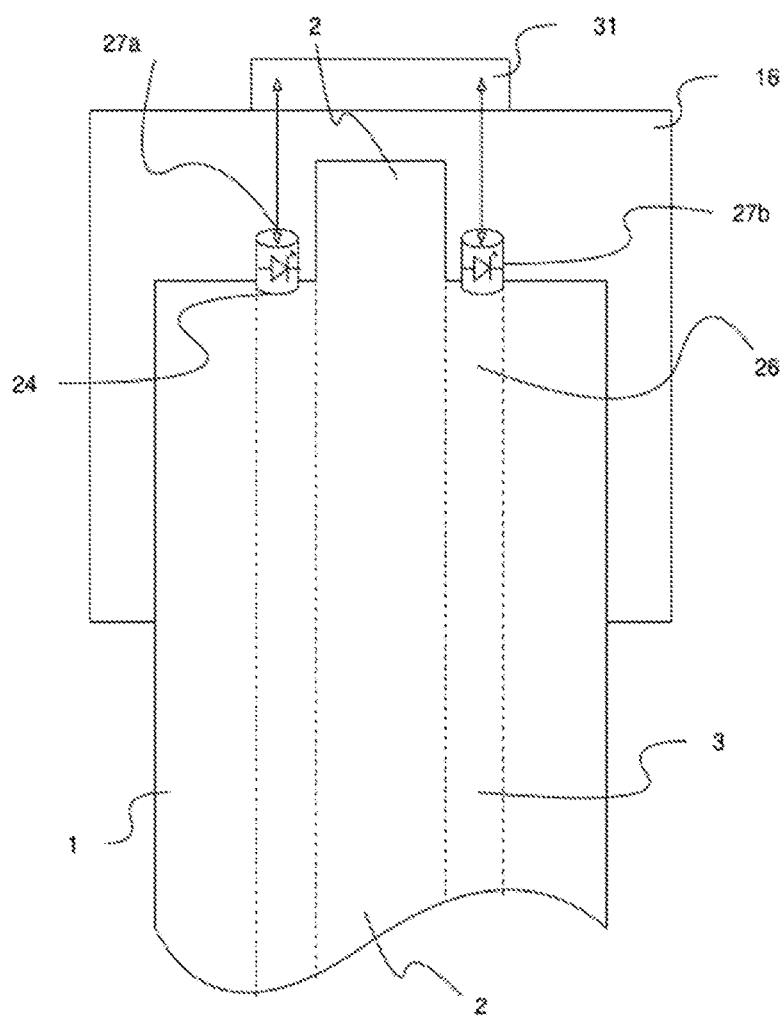
FIG. 6 is a schematic diagram including a circuit for optical communications via the rotatable shaft of FIG. 5.
Figure 7:
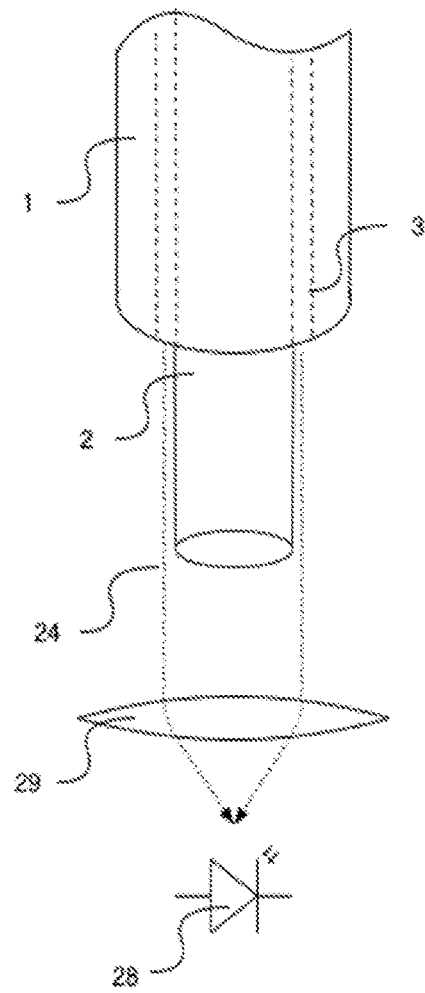
FIG. 7 shows an example of an optical lens arrangement.

In the example shown in FIGS. 5, 6 and 7. the entire insulating cylinder 3 or a part of it 26 can be translucent along its length and act as a photoconductor such that photons of visible and/or infrared wavelength can pass through the entire or part(s) of the cross sectional area of the insulating cylinder 3. As seen in FIG. 5, which takes a section through the shaft 1, 2, 3, an optical wave input 24 can be provided to the translucent insulating/non-conductive material 26 and this will result in an optical wave output 26 from the translucent insulating/non-conductive material at another end of the shaft. FIG. 6 shows a possible arrangement for the propeller end, where the cap 16 may include one or more optical transceiver(s) 27 positioned for optical communication with the optical path 26. A suitable transceiver driving system 31 can provide signals for communication via the optical wave input, and receive signals as an optical wave output. This transceiver driving system 31 may for example be connected to sensing elements on the propeller, such as sensors for measuring thermal or aerodynamic parameters relevant to control of a deicing system. Alternatively or additionally the transceiver driving system 31 may be a part of a control arrangement for the heating coils 21. FIG. 7 shows a possible optical arrangement for the aircraft end of the shaft 1, 2, 3, and this uses a lens 29 to direct the optical wave 24 to or from an optical transceiver 28

Figure 8:
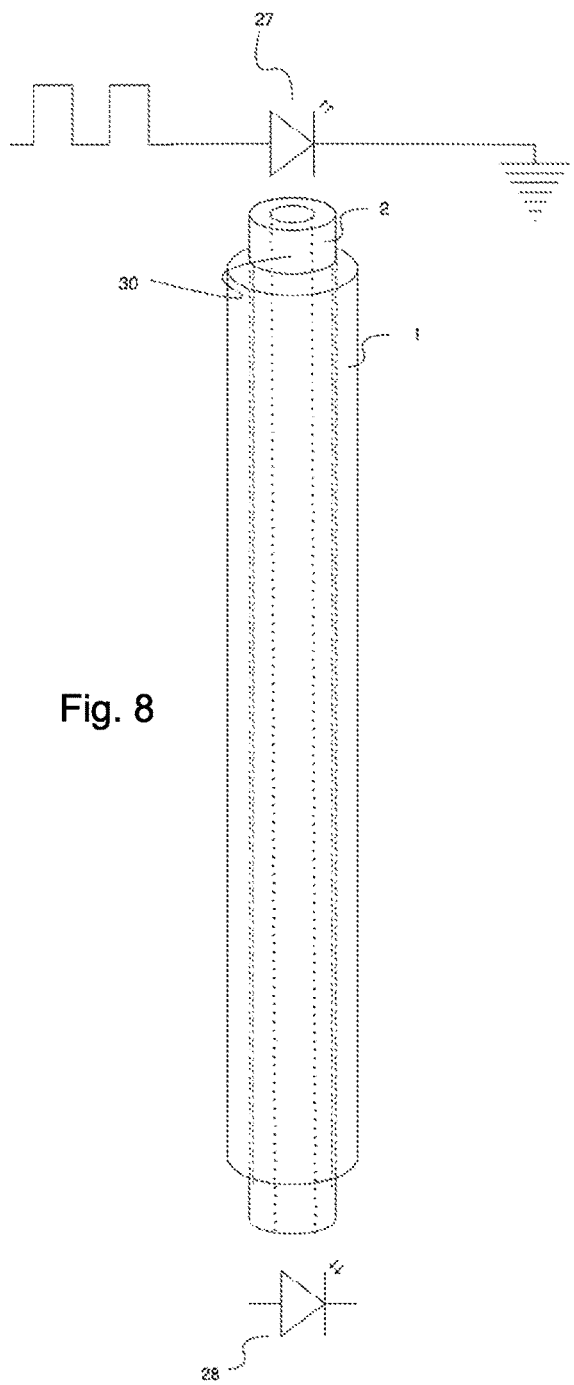
FIG. 8 is a different implementation for optical communications.
Figure 9:
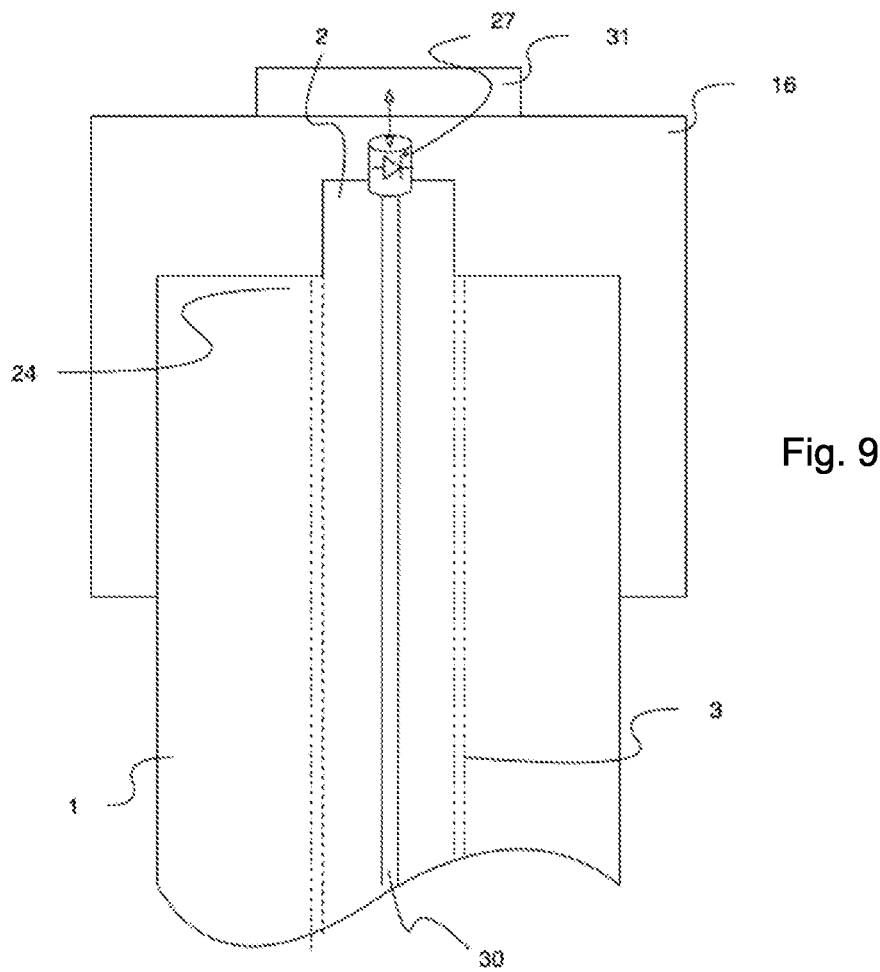
FIG. 9 is a schematic diagram including a circuit for optical communications via the rotatable shaft of FIG. 8.
Figure 10:
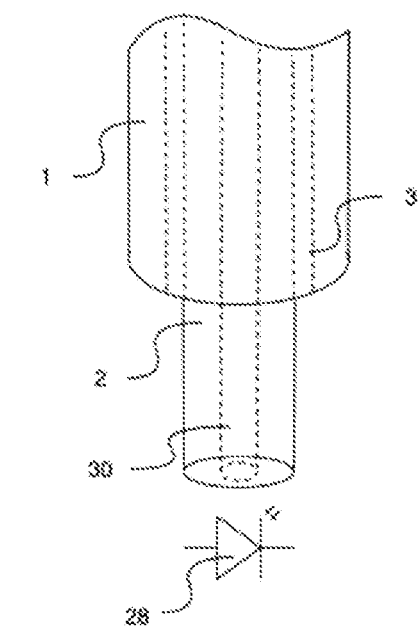
FIG. 10 shows further detail of optical communications using the shaft of FIG. 8.

Another variation is shown in FIGS. 8 to 10. In this example the optical communication is established through a channel 30 in the inner cylinder 2 (i.e. the inner cylinder 2 is hollow) with optical transceivers 27, 28 placed at both ends. The placement of the transceiver 27 on the propeller end of the shaft is illustrated in FIG. 9, which shows one possible way to include the transceiver in the cap 16. The placement of the transceiver 28 at the aircraft end shown in FIG. 10.

The propulsion system and propeller deicing power supply/control features described herein may beneficially be implemented as a part of a small aircraft, in particular for automated or semi-automated aircraft such as an unmanned aerial vehicle (UAV) or an urban mobility aircraft (UAM). Such an aircraft may be a fully electric aircraft, in some examples.

The invention claimed is:

1. A propulsion system for a propeller of an aircraft, the propulsion system comprising:
    a rotatable shaft for transmission of mechanical power;
    aircraft end electrical connections at an aircraft end of the shaft for connection to first and second terminals of a source of electrical power;
    propeller end electrical connections at a propeller end of the shaft, spaced apart from the aircraft end of the shaft, and being for connection to first and second terminals for supplying electrical power to electrical components on the propeller; and
    a mechanical coupling at the propeller end of the shaft for mounting the propeller to the shaft;
    wherein the shaft comprises:
    an inner conductor extending along the length of the shaft and providing an electrically conductive path between the first terminal of the aircraft end electrical connection and the first terminal of the propeller end electrical connection;
    an outer conductor extending along the length of the shaft and providing an electrically conductive path between the second terminal of the aircraft end electrical connection and the second terminal of the propeller end electrical connection; and
    an electrical insulator extending along the shaft in between the inner and outer conductor.

2. A propulsion system as claimed in claim 1, wherein the inner and outer conductors and the electrical insulator have a concentric arrangement with the outer conductor radially outward of the inner conductor.

3. A propulsion system as claimed in claim 1, wherein the outer conductor is a circular tube; the insulator is a circular tube and fitted within the tube of the outer conductor along all of or most of its length; and the inner conductor has a circular outer cross-section and is fitted within the tube of the insulator.

4. A propulsion system as claimed in claim 1, wherein the aircraft end electrical connections comprise electrical couplings joining moving surfaces of the shaft to static conductive parts that are for connection to fixed parts of the aircraft; and wherein the propeller end electrical connections are fixed connections with no relative movement compared to the shaft.

5. A propulsion system as claimed in claim 1, wherein a surface of the outer conductor provides a slip ring surface for the connection to the first terminal of the aircraft end electrical connections, and a slip ring surface for the connection to the second terminal of the aircraft end electrical connections is provided by a surface of the inner conductor.

6. A propulsion system as claimed in claim 5, wherein the slip ring surface of the inner conductor is an outer surface thereof, and at the aircraft end the inner conductor extends axially beyond the extent of the outer conductor and the insulator.

7. A propulsion system as claimed in claim 1, wherein the propeller end electrical connections comprise contact between surfaces of the outer and inner conductors and one or more surface(s) of the mechanical coupling for mounting the propeller to the shaft.

8. A propulsion system as claimed in claim 1, wherein the propeller end electrical connections comprise a first collar in electrical contact with the outer conductor and being for electrical contact with the first terminal at the propeller end; and a second collar in electrical contact with the inner conductor and for electrical contact with the second terminal at the propeller end.

9. A propulsion system as claimed in claim 8, wherein the first collar surrounds the outside of the outer conductor and is configured to abut the propeller at the first contact surface thereof such that the first collar provides an electrical connection for the first terminal as well as a mechanical contact for fixing the position of the propeller on the shaft.

10. A propulsion system as claimed in claim 8, wherein the second collar is configured for placement on an opposite surface of the propeller to the first collar and to fit across the end of the shaft; and wherein the second collar is shaped to extend from the inner conductor to the second contact surface of the propeller.

11. A propulsion system as claimed in claim 10, wherein the second collar has a cupped shape allowing for it to be placed against the contact surface of the propeller at the rim of the cup, with the inner conductor extending into the cup and connecting with the base of the cup.

12. A propulsion system as claimed in claim 1, wherein the inner conductor is longer than both of the outer conductor and the insulator, and the inner conductor protrudes beyond both of the outer conductor and the insulator at the aircraft end of the shaft and at the propeller end of the shaft.

13. A propulsion system as claimed in claim 1, wherein rotatable shaft is an elongate shaft with a length several times greater than its diameter.

14. A propulsion system as claimed in claim 1, wherein the shaft has a diameter in the range 3 to 60 mm and a length in the range 15 to 500 mm.

15. A propulsion system as claimed in claim 1 comprising the propeller as a part of the system, wherein the propeller includes the electrical components for receiving electrical power conducted along the shaft.

16. A propulsion system as claimed in claim 1, wherein the electrical components comprise components on the propeller for providing heating and/or sensing functions.

17. A propulsion system as claimed in claim 1, wherein the electrical components comprise heating elements for a deicing system.

18. A propulsion system as claimed in claim 1, wherein the electrical elements comprise sensing elements for detection of thermal and/or aerodynamic conditions at the propeller, and wherein the sensing elements are configured provide data to a deicing control system.

19. A propulsion system as claimed in claim 1, comprising one or more optical path(s) along the rotatable shaft for optical communications of data.

20. A propulsion system as claimed in claim 19, wherein the optical path(s) include an optical channel at the centre of the shaft.

21. A propulsion system as claimed in claim 1, comprising a source of electrical power connected to the aircraft end electrical connections via the first and second terminals thereof.

22. A propulsion system as claimed in claim 1, wherein the propulsion system is fully electric and comprises a battery system for powering a motor for rotating the rotatable shaft to power the propeller as well as for providing electrical power for the electrical components on the propeller.

23. An aircraft such as an unmanned aerial vehicle (UAV) or an urban mobility aircraft (UAM), the aircraft comprising a propulsion system as claimed in claim 1.

24. A method for providing electrical power to electrical components on a propeller, the method comprising using a propulsion system as claimed in claim 1.

25. A method for control of deicing of a propeller on a propulsion system as claimed in claim 1, the method comprising using the rotatable shaft for transmitting electrical power and/or data for a deicing system, the deicing system comprising heating elements and/or sensor elements on the propeller.

* * * * *